US010944472B2

(12) United States Patent
Manning

(10) Patent No.: US 10,944,472 B2
(45) Date of Patent: Mar. 9, 2021

(54) SYSTEM FOR REPORTING OPTICAL LINK FAILURES USING INTELLIGENT SMALL FORM-FACTOR PLUGGABLE OPTICAL TIME DOMAIN REFLECTOMETER

(71) Applicant: NET2EDGE LIMITED, Basingstoke (GB)

(72) Inventor: Timothy William Manning, Surrey (GB)

(73) Assignee: NET2EDGE LIMITED, Basingstoke (GB)

( * ) Notice: Subject to any disclaimer, the term of this patent is extended or adjusted under 35 U.S.C. 154(b) by 0 days.

(21) Appl. No.: 16/923,374

(22) Filed: Jul. 8, 2020

(65) Prior Publication Data

US 2021/0013961 A1 Jan. 14, 2021

Related U.S. Application Data

(60) Provisional application No. 62/871,264, filed on Jul. 8, 2019.

(51) Int. Cl.
*H04B 10/071* (2013.01)
*H04B 10/40* (2013.01)
*H04B 10/25* (2013.01)
*H04L 29/08* (2006.01)
(Continued)

(52) U.S. Cl.
CPC ....... *H04B 10/071* (2013.01); *H04B 10/0771* (2013.01); *H04B 10/25* (2013.01); *H04B 10/40* (2013.01); *H04L 69/324* (2013.01); *H04Q 11/0062* (2013.01); *H04Q 2011/0081* (2013.01); *H04Q 2011/0083* (2013.01)

(58) Field of Classification Search
None
See application file for complete search history.

(56) References Cited

U.S. PATENT DOCUMENTS

| 9,036,991 | B2 | 5/2015 | Aguren |
| 9,143,228 | B2 | 9/2015 | Sandstrom |
| 9,143,236 | B1 * | 9/2015 | Bartur .................. H04B 10/071 |

(Continued)

FOREIGN PATENT DOCUMENTS

| EP | 2 842 244 A1 | 3/2015 |
| WO | 2011/053306 A1 | 5/2011 |
| WO | 2013/134404 A1 | 9/2013 |

OTHER PUBLICATIONS

Extended European search report for European Patent Application No. 20184682.1, dated Nov. 26, 2020, 9 pages.
(Continued)

*Primary Examiner* — David W Lambert
(74) *Attorney, Agent, or Firm* — John Veldhuis-Kroeze; Westman, Champlin & Koehler, P.A.

(57) ABSTRACT

Disclosed embodiments include a small form-factor pluggable (SFP) optical transceiver having optical time domain reflectometer functionality. A monitor processor is included in the transceiver to report link status and failure information to a cloud-based monitoring application. When a fiber optic link is established, the monitor processor remains idle to reduce power consumption by the transceiver. Upon failure of the link, the monitor processor sends a failure report to the monitoring application which can use the data to alert operators to presence and location of optical fiber breaks in the network.

11 Claims, 4 Drawing Sheets

(51) Int. Cl.
*H04B 10/077* (2013.01)
*H04Q 11/00* (2006.01)

(56) References Cited

U.S. PATENT DOCUMENTS

| | | | | |
|---|---|---|---|---|
| 2010/0080554 A1* | 4/2010 | Aguren | ................ | H04B 10/073 398/20 |
| 2011/0170858 A1* | 7/2011 | Aguren | ................ | H04B 10/079 398/22 |
| 2011/0173315 A1* | 7/2011 | Aguren | .................. | H04L 63/20 709/224 |
| 2012/0020672 A1* | 1/2012 | Aguren | .............. | G01M 11/3154 398/139 |
| 2013/0272694 A1 | 10/2013 | Sandstrom | | |

OTHER PUBLICATIONS

Parkin, Neil et al., "Gigabit SFP Transceiver with Integrated Optical Time Domain Reflectometer for Ethernet Access Services", 39th European Conference and Exhibition on Optical Communication (ECOC 2013), Jan. 1, 2013, ISBN: 978-1-84919-759-5, http://ieeeexplore.ieee.org/stamp/stamp.jsp?arnumber=6647519, ECOC 2013 Mo.4.F.3.pdf, 3 pages.

* cited by examiner

SYSTEM FOR REPORTING OPTICAL LINK FAILURES USING INTELLIGENT SMALL FORM-FACTOR PLUGGABLE OPTICAL TIME DOMAIN REFLECTOMETER

CROSS-REFERENCE TO RELATED APPLICATION

This application claims priority to U.S. provisional application 62/871,264, filed on Jul. 8, 2019, the content of which is hereby incorporated by reference in its entirety.

BACKGROUND OF THE INVENTION

The present invention relates to optical time domain reflectometers (OTDRs) used to characterize optical fibers and pluggable optical transceivers used to provide optical fiber communications to an aggregator switch or other host device.

Aggregator switches are switches which connect a number of other switches or endpoint devices. These connections can be made through optical fiber links, requiring optical transceiver circuitry or devices at both the aggregator switch and endpoint ends of the optical links. Such optical transceiver devices can be small form-factor pluggable, meaning that the transceiver circuitry fits within a small enough space and uses sufficiently low power to allow the transceiver circuitry device to be connected to the aggregator switch or host device through a port or plug-in connection that enables communication with a host controller, and optionally which allow the transceiver to be powered solely by power received from the aggregator switch or host device.

In order to ensure communication using fiber communications, it can be beneficial to employ an OTDR to characterize the fiber links between the aggregator switch and an end-point device. Devices such as OTDRs inject a series of optical pulses into the fiber under test and extract, from the same end of the fiber, light that is scattered (Rayleigh backscatter) or reflected back from points along the fiber. The scattered or reflected light that is gathered back is used to characterize the optical fiber. The strength of the return pulses is measured and integrated as a function of time, and plotted as a function of fiber length. Using these results, breaks, kinks and other performance effecting fiber conditions can be detected.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter.

Disclosed embodiments include a small form-factor pluggable (SFP) optical transceiver having optical time domain reflectometer (OTDR) functionality. A monitor processor is included in the transceiver to report link status and failure information to a cloud-based monitoring application. When a fiber optic link is established, the monitor processor remains idle to reduce power consumption by the transceiver. Upon failure of the link, the monitor processor sends a failure report to the monitoring application.

One general aspect of a disclosed embodiment includes a small form-factor pluggable (SFP) optical transceiver (100) configured to be plugged into an external data port (102) of an aggregator switch (110), the SFP optical transceiver including: a connector (200) configured to be inserted into the external data port (102) of the aggregator switch; an optical fiber input port (242) configured to connect the SFP transceiver to an end point computing device (120) through an optical fiber cable (115) to establish an optical fiber link (117); a transceiver switch (240) having first and second inputs (206; 214) and having an output (208) coupled to the connector; optical circuitry components (210) configured to convert between optical signals (202) received from or transmitted to the end point computing device (120) over the optical fiber cable (115) and electrical signals (204); optical time domain reflectometer (OTDR) control circuitry (230) coupled between the optical circuitry components and the first input (206), the OTDR control circuitry configured to control the optical circuitry components and flow of electrical signals between the aggregator switch (110) and the optical circuitry components (210) through the transceiver switch (240), the OTDR control circuitry further configured to analyze the electrical signals to perform OTDR analysis to monitor a status of the optical fiber link (117) and, in the event of a link failure, stop the flow of electrical signals between the aggregator switch and the optical circuitry components and generate a link failure signal (212); and a monitoring processor (220) coupled to the OTDR control circuitry (230) and to the second input (214), where the monitoring processor is configured such that, upon receiving the link failure signal (212), the monitoring processor wakes from an idle state and transmits a report, through the transceiver switch (240) and the aggregator switch (110), to a monitoring application (130) on a remote computing device (125).

Implementations may include one or more of the following features. The SFP optical transceiver and further including power supply circuitry (201) coupled through the connector (200) to a source of power from the aggregator switch (110) and configured to provide power for operation of the SFP optical transceiver.

The SFP optical transceiver where the monitoring processor (220) is configured such that, during operation when no optical link failure has been detected by the OTDR control circuitry (230), the monitor processor (220) remains in the idle state to reduce power consumption.

The SFP optical transceiver where the monitoring processor (220) is further configured such that, after transmitting the report to the monitoring application on the remote computing device, the monitoring processor passes control back to the OTDR control circuitry (230) and returns to the idle state.

The SFP optical transceiver where the OTDR control circuitry (230) is further configured such that, after the monitoring processor (220) passes control back to the OTDR control circuitry, the OTDR control circuitry attempts to re-establish the optical fiber link (117) over the optical fiber cable.

The SFP optical transceiver where the report includes optical fiber link characterization and diagnostic data.

The SFP optical transceiver where the OTDR control circuitry (230) and the monitoring processor (220) are configured such that only one of the OTDR control circuitry and the monitoring processor controls, at any given time, the flow of electrical signals through the transceiver switch (240).

The SFP optical transceiver where the monitoring processor is further configured to perform a registration phase (254) by transitioning from the idle state and transmitting, through the transceiver switch (240) and through the aggregator switch (110), presence data of the aggregator switch (110) and of the end point computing device (120) to the monitoring application (130) on the remote computing device (125); Implementations of the described techniques may include hardware, a method or process, or computer software on a computer-accessible medium.

Other embodiments of this aspect can include corresponding computer systems, controllers, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method (250) of controlling a small form-factor pluggable (SFP) optical transceiver (100) plugged into an external data port (102) of an aggregator switch (110) and connected to an end point computing device (120) through an optical fiber (115), the method including: performing a registration phase (254) including transitioning a monitoring processor (220) of the SFP optical transceiver from an idle state and transmitting from the monitoring processor, through a first input (214) of a transceiver switch (240) coupled to the monitoring processor and through the aggregator switch (110), presence data of the aggregator switch (110) and of the end point computing device (120) to a monitoring application (130) on a remote computing device (125); establishing (256), using optical time domain reflectometer (OTDR) control circuitry (230) and optical circuitry components (210) of the SFP optical transceiver, an optical data communications link (117) with endpoint computing device (120) over the optical fiber (115); entering (258) a linked state, if the optical data communications link is successfully established, transitioning the monitoring processor (220) to the idle state, controlling the optical data communications link with the OTDR control circuitry (230), and communicating between the OTDR control circuitry and the aggregator switch through a second input (206) of the transceiver switch (240); entering (260) a link failed state, if the optical data communications link is not successfully established or if a link failure occurs after the optical data communications link was successfully established, transitioning the monitoring processor (220) from the idle state, and transmitting (262) from the monitoring processor and through the first input a link failure report to the monitoring application (130) on the remote computing device (125); and returning control to the OTDR control circuitry (230) and re-establishing (256) the optical data communications link. Other embodiments of this aspect include corresponding computer systems, apparatus, and computer programs recorded on one or more computer storage devices, each configured to perform the actions of the methods.

Implementations may include one or more of the following features. The method where the presence data includes IP addresses of the aggregator switch and of the end point computing device. The method where performing the registration phase further includes using the monitoring processor (220) to implement a link layer discovery protocol (LLDP) to establish the IP addresses of the aggregator switch the end point computing device. Implementations of the described techniques may include hardware, configurable controllers or circuitry, methods or processes, or computer software on a computer-accessible medium.

BRIEF DESCRIPTION OF THE DRAWINGS

FIGS. 2-1 and 2-2 are diagrammatic schematic illustrations of an exemplary SFP OTDR transceiver.

DETAILED DESCRIPTION

Before disclosed embodiments are explained in detail, it is to be understood that the disclosed embodiments are not limited in application to the details of construction and the arrangement of components set forth in the following description or illustrated in the following drawings. Other embodiments can be used, and the disclosed methods, apparatus and systems can be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "coupled" and variations thereof are used broadly and encompass both direct and indirect connections and couplings. Further, "connected" and "coupled" are not restricted to physical or mechanical connections or couplings.

Exemplary disclosed embodiments are implemented in a small form-factor pluggable (SFP) optical transceiver device configured to be plugged into a SFP data port. The SFP optical transceiver includes circuitry and components to provide OTDR functionality to monitor the optical link, eliminating the need for a separate OTDR. The disclosed SFP optical transceiver is enhanced through the use of IOT monitoring processor and a switch which allows OTDR failure reports to be communicated to a remote monitoring application, but operated such that there is not an appreciable increase in the normal operating power consumption of the device. Using power reducing features described in detail below, the disclosed SFP optical transceiver with OTDR reporting functionality is powered, in some embodiments, using power available from the switch port to which the transceiver is coupled.

Figure 1:
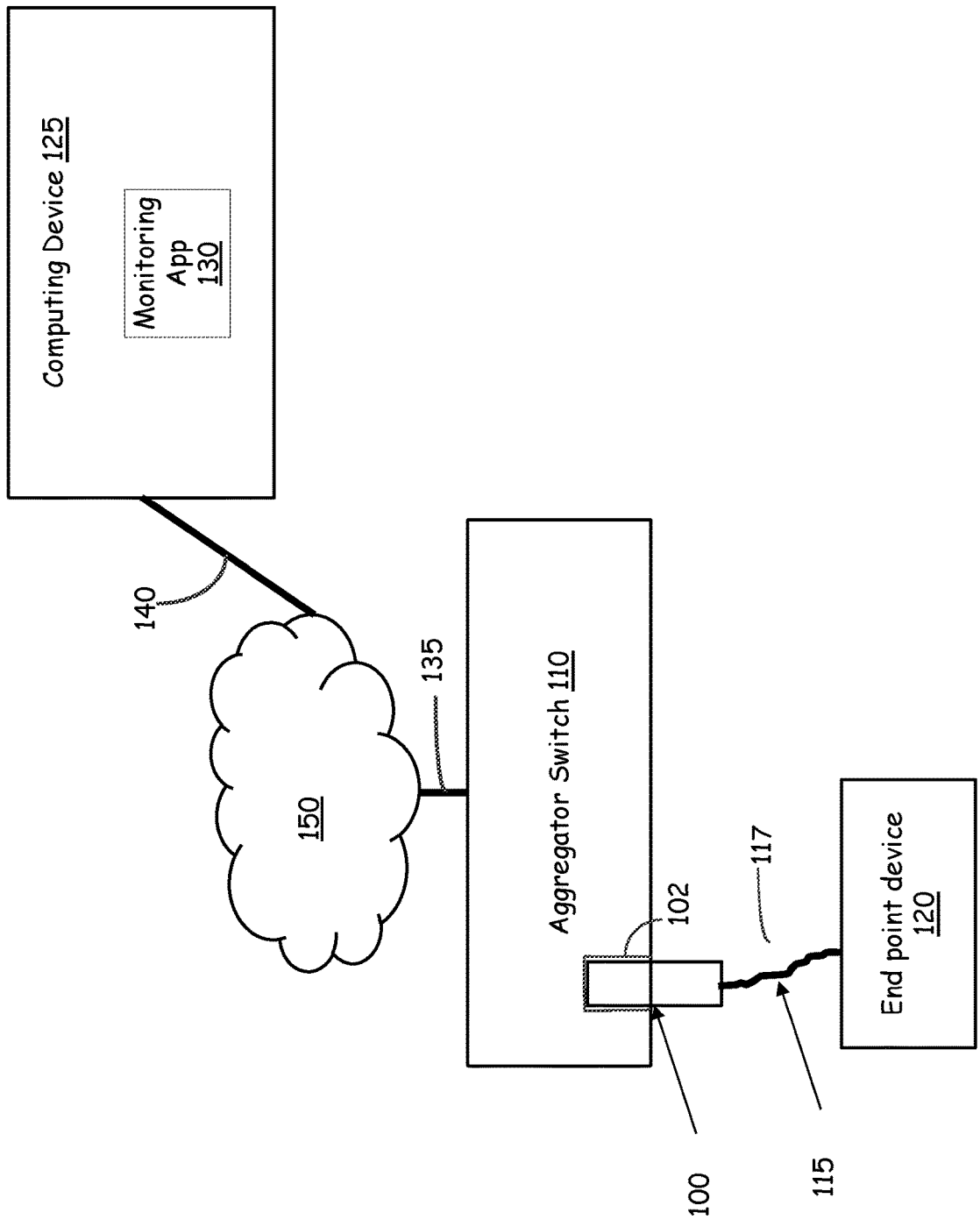
FIG. 1 is a diagrammatic illustration of an aggregator switch utilizing the SFP OTDR transceiver to establish and maintain a fiber optic communications link with an end point device.

Referring now to FIG. 1, shown is an aggregator switch 110 with which disclosed embodiments can be utilized in example embodiments. Aggregator switch 110 includes a data port 102 configured to receive data signals and to provide power to a device coupled to the port. SFP optical transceiver 100 is shown inserted into, or coupled to, port 102 and connected to an optical fiber cable 115 between an endpoint computing device 120 and the aggregator switch. As used herein, an optical fiber data link 117 is a data link established between aggregator switch 100 and end point computing device 120 over optical fiber cable 115. Transceiver 100 includes optical transceiver circuitry configured to convert non-optical data signals from aggregator switch 110 into optical signals for transmission over the optical fiber cable/link 115/117 to an endpoint device 120. The optical transceiver circuitry of transceiver 100 is also configured to convert optical data signals received over optical fiber link 117 from endpoint device 120 into non-optical data signals for processing or routing by aggregator switch 110. Endpoint device can be another switch, a modem, a computer or other types of computing devices.

Figure 4:
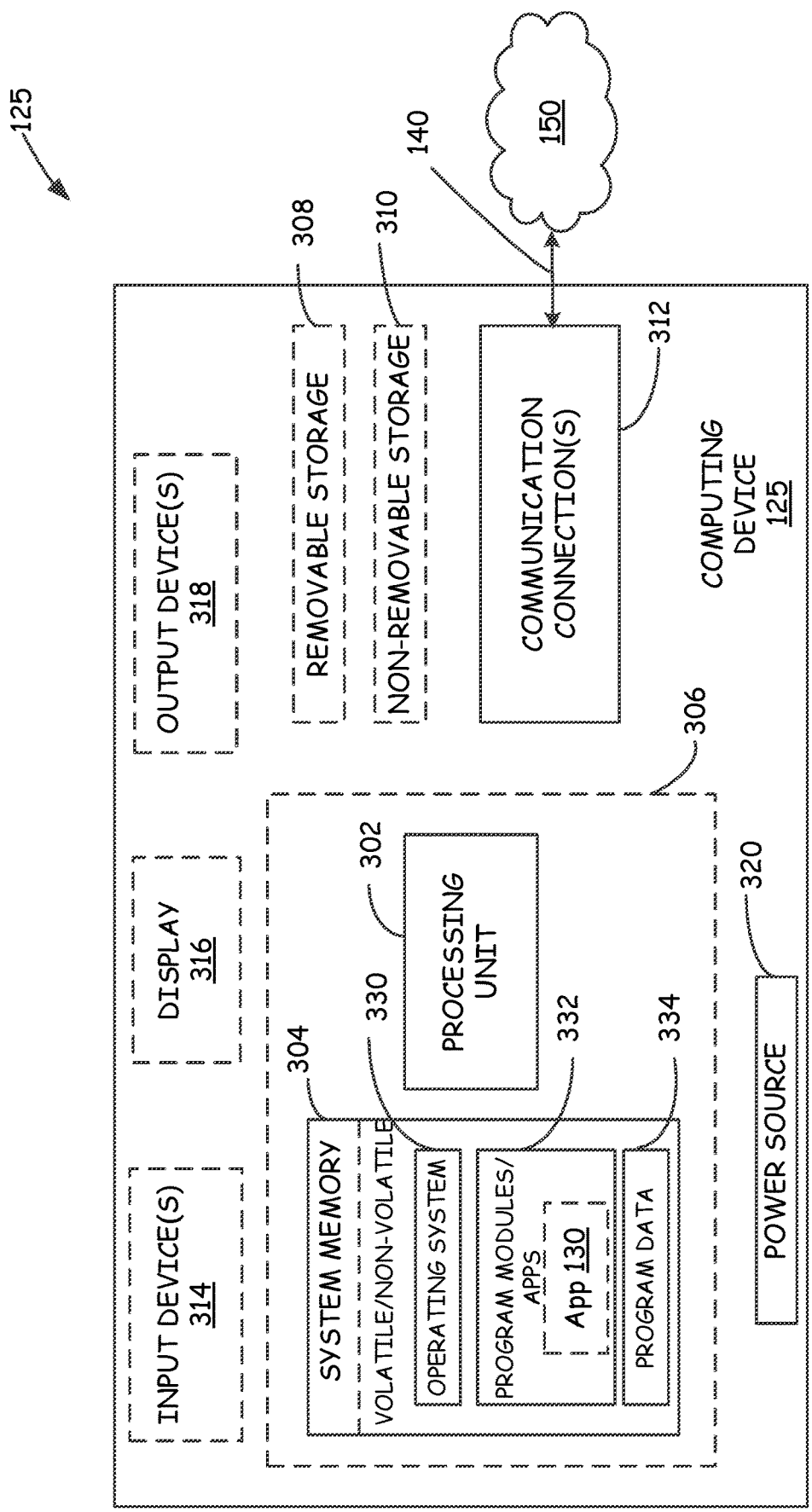
FIG. 4 is a block diagram of an exemplary computing device on which aspects of disclosed embodiments can be implemented.

Aggregator switch 110 is also coupled, through data cables 135 and 140 and a network 150 such as the internet, to another computing device 125. Computing device 125 is a computer configured to run a monitoring application 130 to monitor the optical link with the aid of the OTDR functionality of the SFP optical transceiver 100. An example of a computing device of a type which can be used for computing device 125 is shown in FIG. 4 and discussed further below. While providing optical transceiver functionality to provide data communications between aggregator switch 110 and endpoint device 125, transceiver 100 monitors optical fiber link 117 for damage or conditions (e.g., kinks) which cause optical link failure. Transceiver 100 is configured such that, in the event of an optical link failure, the transceiver sends a report to monitoring application 130 in remote computing device 125 using the upstream link through cables 135 and 140 and network 150.

Figures 1, 2:
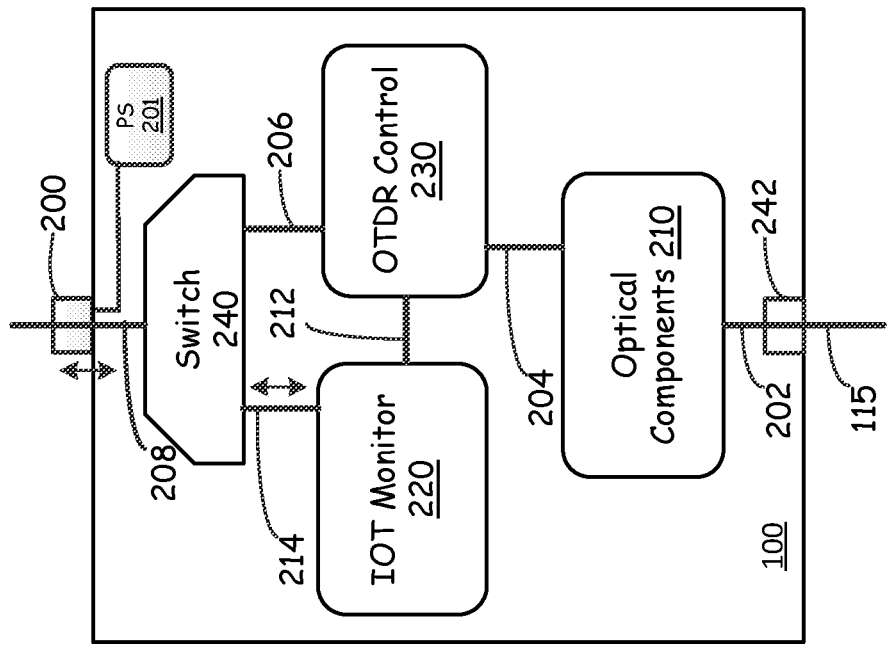
Figure 2:
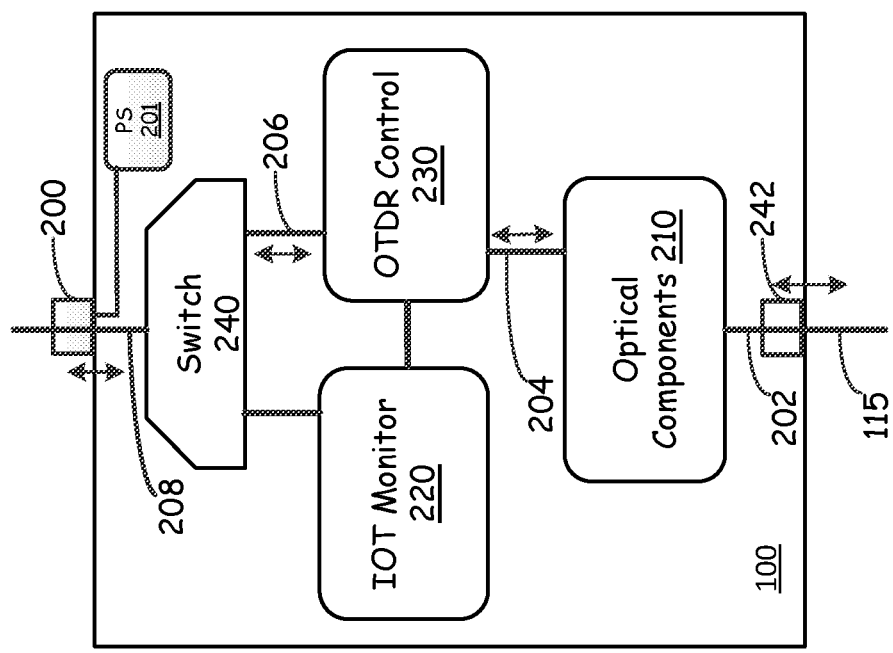

Referring now to FIGS. 2-1 and 2-2, shown are example embodiments of optical transceiver 100 in accordance with an exemplary embodiment. As shown, transceiver 100 can include a male plug or connector 200 or similar component configured to be inserted into a female port or connector of aggregator switch 110 as shown in FIG. 1. In some embodiments, power supply circuitry 201 is included in transceiver 100 and is coupled through connector 200 to a source of power from the aggregator switch in order to power the transceiver components solely using power available from the switch port. Transceiver 100 also includes an optical fiber input port 242 configured to receive or connect to an optical fiber connector of an optical fiber cable 115 to provide the optical fiber link 117 to end point computing device 120 as shown in FIG. 1.

As also shown in FIGS. 2-1 and 2-2, transceiver 100 includes optical components 210 which are configured to convert optical energy signals 202 into electrical energy signals 204, and vice versa, to receive data from and send data to end point device 120 over optical fiber link 117. Thus, optical components 210 includes electronic components configured to condition and encode/decode data into light pulses and into electrical signals. Any desired optical transceiver technology can be utilized, implementing any of a variety of different laser types, modulation and demodulation schemes, etc.

Also included within optical transceiver 100 is control circuitry 230, for example in the form of a microprocessor or other controller, which is configured to control the optical components 210 and to provide the electrical signals 204 for the flow of data transmitted by the optical components. Control circuitry 230 also controls the flow of data received in electrical signals 204 from optical components 210 and provided as signals 206 to a one input of a switch 240. The output electrical data signals 208 are processed and routed by aggregator switch 110. The flow of data through switch 240, control circuitry 230 and optical components 210 can of course occur in the opposite direction as shown by arrows in FIG. 2-1. Thus, control circuitry 230 is configured to control data communications through transceiver 100. FIG. 2-1 represents the flow of data signals through components of transceiver 100 when optical fiber link 117 is operating properly.

In exemplary embodiments, control circuitry 230 is also configured to monitor the electrical signals 204 to perform OTDR analysis functions. Thus, control circuitry 230 monitors the link status (e.g., the quality of the connection through optical fiber link 117) and, in the event of a link failure, generates link failure signals 212 as shown in FIG. 2-2. The link failure signals 212 can include detailed link characterization or diagnostic data in some embodiments. In other embodiments, the link failure signals only provide an indication that a link failure has occurred in optical fiber link 117.

As shown in FIGS. 2-1 and 2-2, optical transceiver 100 also includes a separate monitoring processor 220 in exemplary embodiments. Monitoring processor 220 provides enhanced OTDR reporting features for transceiver 100, without consuming a substantial amount of power. During normal operation (FIG. 2-1) when no optical link failure has been detected by control circuitry 230, monitor processor 220 remains idle and data flows between switch 240 and control circuitry 230, and between control circuitry 230 and optical components 210. In the event of a link failure being detected (FIG. 2-2), the control circuitry 230 takes down the link (e.g., prevents transmission through optical components 210) and, through link failure signals 212, fully wakes monitor processor 220 to pass control the to the monitor processor. The monitor processor 220 then sends a report, through another input 214 to switch 240 and output 208 of transceiver 100, to monitoring application 130 of computing device 125. In exemplary embodiments, computing device 125 provides monitoring application 130 as a cloud-based application. Once the link failure report is sent to monitoring application 130, monitor processor 220 passes control back to control circuitry 230 to attempt link-re-establishment on fiber optic cable 115. Because monitoring processor 220 remains idle during normal operation, power consumption of transceiver 100 is minimized while OTDR monitoring is provided in addition to data communications.

Figure 3:
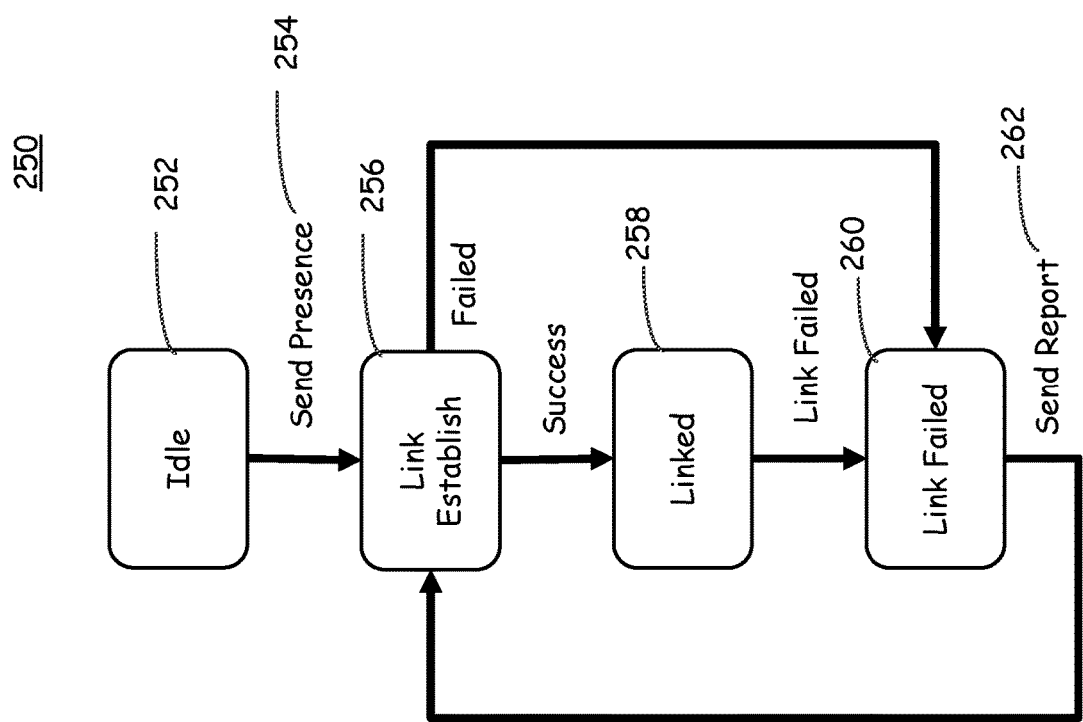
FIG. 3 is a state diagram illustrating functions of an exemplary SFP OTDR transceiver in some embodiments.

Referring now to FIG. 3, shown is a state diagram 250 illustrating functions of transceiver 100 in some exemplary embodiments. State diagram 250 represents exemplary methods in accordance with some embodiments. At start-up, when connected to aggregator switch 110, monitoring processor 220 leaves idle state 252 and transmits presence data to monitoring application 130. This is shown in FIG. 3 at 254. The presence data includes IP addresses of neighboring devices of aggregator switch 110. The monitoring application then associates the transceiver 100 with the aggregator switch 110 it is plugged into so that the monitoring application can periodically check that the transceiver is still present in the network, without interrupting the data flow through the transceiver. In an exemplary embodiment, at this registration phase 254, the monitor processor 220 can use the link layer discovery protocol (LLDP) to establish the IP addresses of the aggregator switch 110 into which transceiver 100 is inserted, as well as the IP address of the end point device at the far end of the fiber cable 115. The monitoring application uses this information to infer that the fiber link is being maintained, without directly interacting with the transceiver control circuitry and functions themselves, thereby maintaining the network topology without interfering with the traffic flow through the SFP OTDR transceiver 100.

At 256, transceiver 100 attempts to establish a data communications link to endpoint device 120 over fiber optic cable/link 115/117. If the link is successfully established, transceiver 100 enters a linked state as shown at 258, and monitor processor 220 enters an idle state. If a link is not established, or if a link failure occurs after a link was established, transceiver 100 enters a link failed state as shown at 260. In this link failed state, monitor processor 220 leaves the idle state and sends a link failure report to the monitoring application 130 as discussed above. This is shown in FIG. 3 at 262. After reporting the link failure to the monitoring application, monitor processor 220 passes control back to control circuitry 230 which again attempts to establish the link.

While exemplary embodiments include some or all of the above-described features of SFP OTDR transceiver 100, exemplary embodiments also include the use of a cloud-based monitoring application interacting with the transceiver to monitor link status. As such, the exemplary embodiments can include computer implemented methods, computer readable instructions, and configured computing devices.

Although not required, disclosed embodiments are at times described in the general context of computer-executable instructions, such as program modules or apps, being executed by an electronic device such as microcontroller, a microprocessor, etc. Generally, program modules include routines, programs, objects, components, data structures, etc. that perform particular tasks or implement particular abstract data types.

In the description above, disclosed embodiments can be described with reference to acts and symbolic representations of operations that are performed by one or more devices, unless indicated otherwise. As such, it will be understood that such acts and operations, which are at times referred to as being computer-executed, include the manipulation by microcontrollers, microprocessors, processing units, or other circuitry of the device of electrical signals representing data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while disclosed embodiments are described in this context, it is not meant to be limiting as those of skill in the art will appreciate that various of the acts and operations described herein may also be implemented in hardware such as application-specific integrated circuits (ASICs), discrete circuitry components, etc.

FIG. 4 shows a computing device 125, such as a PC. In its most basic configuration, the computing device 125 includes at least a processing unit 302 and a memory 304. Depending on the exact configuration and type of computing device, the memory 304 may be volatile (such as RAM), non-volatile (such as ROM, flash memory, etc.) or some combination of the two. This most basic configuration is illustrated in FIG. 4 by a dashed line 306.

Additionally, the device 125 may also have further features/functionality. For example, the device 125 may also include additional storage (removable and/or non-removable) including, but not limited to, magnetic or optical disks or tapes, USB flash drives, memory cards, etc. Such additional storage is illustrated in FIG. 4 by a removable storage 308 and a non-removable storage 310. Computer storage media includes volatile and nonvolatile, removable and non-removable media implemented in any method or technology for storage of information such as computer readable instructions, data structures, program modules or other data. The memory 304, the removable storage 308 and the non-removable storage 310 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 125. Any such computer storage media may be part of the device 125.

System memory 304 may include operating system 330, one or more programming modules or apps 332 (including monitoring application 130 discussed above), and program data 334. Operating system 330, for example, may be suitable for controlling computing device 125's operation. As stated above, a number of program modules 332 and data files 334 may be stored in system memory 304, including operating system 330.

Generally, consistent with disclosed embodiments, program modules or apps may include routines, programs, components, data structures, and other types of structures that may perform particular tasks or that may implement particular abstract data types. Moreover, disclosed embodiments may be practiced with other computer system configurations, including multiprocessor systems, microprocessor-based or programmable consumer electronics, minicomputers, mainframe computers, and the like. Disclosed embodiments may also be practiced in distributed computing environments where tasks are performed by remote processing devices that are linked through a communications network. In a distributed computing environment, program modules may be located in both local and remote memory storage devices.

Furthermore, some disclosed embodiments may be practiced in an electrical circuit comprising discrete electronic elements, packaged or integrated electronic chips containing logic gates, a circuit utilizing a microprocessor, or on a single chip containing electronic elements or microprocessors. Some disclosed embodiments may also be practiced using other technologies capable of performing logical operations such as, for example, AND, OR, and NOT, including but not limited to mechanical, optical, fluidic, and quantum technologies. In addition, some disclosed embodiments may be practiced within a general-purpose computer or in any other circuits or systems.

Disclosed embodiments, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the disclosed embodiments may be embodied in hardware and/or in software (including firmware, resident software, micro-code, etc.). In other words, some disclosed embodiments may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain, store, communicate, propagate, or transport the program for use by or in connection with the instruction execution system, apparatus, or device.

Device 125 includes communications connections 312 which allow communication though connections 140 to a network 150 such as the Internet as discussed above. Also shown with computing device 125 are one or more display devices 316, one or more input devices 314, such as a keyboard, mouse, pen, voice input device, etc., for providing other input to the computing device, and one or more other output devices 318 such as speakers, a printer, a vibration generator, etc. All these devices are well known in the art and need not be discussed at greater length here. Further, display device 316, input devices 314 and output devices 318 can all be considered to be separate from, or alternatively part of, computing device 125. Computing device 125 has a power source 320, such as a power supply, that provides power for computations, communications and so forth by the device 125.

Although the present invention has been described with reference to preferred embodiments, workers skilled in the art will recognize that changes may be made in form and detail without departing from the spirit and scope of the invention.

What is claimed is:

1. A small form-factor pluggable (SFP) optical transceiver configured to be plugged into an external data port of an aggregator switch, the SFP optical transceiver comprising:
    a connector configured to be inserted into the external data port of the aggregator switch;
    an optical fiber input port configured to connect the SFP transceiver to an end point computing device through an optical fiber cable to establish an optical fiber link;
    a transceiver switch having first and second inputs and having an output coupled to the connector;
    optical circuitry components configured to convert between optical signals received from or transmitted to the end point computing device over the optical fiber cable and electrical signals;
    optical time domain reflectometer (OTDR) control circuitry coupled between the optical circuitry components and the first input, the OTDR control circuitry configured to control the optical circuitry components and flow of electrical signals between the aggregator switch and the optical circuitry components through the transceiver switch, the OTDR control circuitry further configured to analyze the electrical signals to perform OTDR analysis to monitor a status of the optical fiber link and, in the event of a link failure, stop the flow of electrical signals between the aggregator switch and the optical circuitry components and generate a link failure signal; and
    a monitoring processor coupled to the OTDR control circuitry and to the second input, wherein the monitoring processor is configured such that, upon receiving the link failure signal, the monitoring processor wakes from an idle state and transmits a report, through the transceiver switch and the aggregator switch, to a monitoring application on a remote computing device.

2. The SFP optical transceiver of claim 1, and further comprising power supply circuitry coupled through the connector to a source of power from the aggregator switch and configured to provide power for operation of the SFP optical transceiver.

3. The SFP optical transceiver of claim 1, wherein the monitoring processor is configured such that, during operation when no optical link failure has been detected by the OTDR control circuitry, the monitor processor remains in the idle state to reduce power consumption.

4. The SFP optical transceiver of claim 3, wherein the monitoring processor is further configured such that, after transmitting the report to the monitoring application on the remote computing device, the monitoring processor passes control back to the OTDR control circuitry (230) and returns to the idle state.

5. The SFP optical transceiver of claim 4, wherein the OTDR control circuitry is further configured such that, after the monitoring processor passes control back to the OTDR control circuitry, the OTDR control circuitry attempts to re-establish the optical fiber link over the optical fiber cable.

6. The SFP optical transceiver of claim 1, wherein the report includes optical fiber link characterization and diagnostic data.

7. The SFP optical transceiver of claim 1, wherein the OTDR control circuitry and the monitoring processor are configured such that only one of the OTDR control circuitry and the monitoring processor controls, at any given time, the flow of electrical signals through the transceiver switch.

8. The SFP optical transceiver of claim 1, wherein the monitoring processor is further configured to perform a registration phase by transitioning from the idle state and transmitting, through the transceiver switch and through the aggregator switch, presence data of the aggregator switch and of the end point computing device to the monitoring application on the remote computing device.

9. A method of controlling a small form-factor pluggable (SFP) optical transceiver plugged into an external data port of an aggregator switch and connected to an end point computing device through an optical fiber, the method comprising:
    performing a registration phase including transitioning a monitoring processor of the SFP optical transceiver from an idle state and transmitting from the monitoring processor, through a first input of a transceiver switch coupled to the monitoring processor and through the aggregator switch, presence data of the aggregator switch and of the end point computing device to a monitoring application on a remote computing device;
    establishing, using optical time domain reflectometer (OTDR) control circuitry and optical circuitry components of the SFP optical transceiver, an optical data communications link with endpoint computing device over the optical fiber;
    entering a linked state, if the optical data communications link is successfully established, transitioning the monitoring processor to the idle state, controlling the optical data communications link with the OTDR control circuitry, and communicating between the OTDR control circuitry and the aggregator switch through a second input of the transceiver switch;
    entering a link failed state, if the optical data communications link is not successfully established or if a link failure occurs after the optical data communications link was successfully established, transitioning the monitoring processor from the idle state, and transmitting from the monitoring processor and through the first input a link failure report to the monitoring application on the remote computing device; and
    returning control to the OTDR control circuitry and re-establishing the optical data communications link.

10. The method of claim 9, wherein the presence data includes IP addresses of the aggregator switch and of the end point computing device.

11. The method of claim 10, wherein performing the registration phase further includes using the monitoring processor to implement a link layer discovery protocol (LLDP) to establish the IP addresses of the aggregator switch the end point computing device.

* * * * *